United States Patent [19]
Thompson

[11] Patent Number: 5,516,181
[45] Date of Patent: May 14, 1996

[54] ROLL-UP ENVIRONMENTAL ELEMENTS PROTECTOR FOR A MOTOR VEHICLE

[76] Inventor: Craig D. Thompson, 21752 Contado Rd., Boca Raton, Fla. 33433

[21] Appl. No.: 369,005

[22] Filed: Jan. 5, 1995

[51] Int. Cl.⁶ ................................................ B60J 11/00
[52] U.S. Cl. .................. 296/98; 150/166; 160/121.1; 280/770; 296/136
[58] Field of Search ............... 296/98, 136; 150/166; 280/770; 40/602, 591; 160/121.1

[56] References Cited

U.S. PATENT DOCUMENTS

| | | | |
|---|---|---|---|
| 2,248,655 | 7/1941 | Bila | 150/166 |
| 2,751,977 | 6/1956 | Pinkerton | 160/368 |
| 2,871,931 | 2/1959 | Hastings | 296/98 X |
| 3,050,075 | 8/1962 | Kaplan et al. | 296/98 |
| 3,316,012 | 4/1967 | Thier | 296/136 |
| 4,480,675 | 11/1984 | Berkemeier | 160/121.1 |
| 4,718,711 | 1/1988 | Rabbit | 296/136 |
| 4,825,889 | 5/1989 | Monteith | 296/136 X |
| 4,848,823 | 7/1989 | Flohr et al. | 296/98 |
| 4,856,842 | 8/1989 | Ross et al. | 296/136 |
| 4,929,016 | 5/1990 | Kastanis | 296/136 |
| 4,951,993 | 8/1990 | Taboada | 150/166 X |
| 4,958,881 | 9/1990 | Piros | 296/98 |
| 4,966,406 | 10/1990 | Karasik et al. | 296/98 |
| 5,022,700 | 6/1991 | Fasiska et al. | 296/98 |
| 5,029,933 | 7/1991 | Gillem | 296/136 |
| 5,056,839 | 10/1991 | Yoon et al. | 293/117 |
| 5,078,446 | 1/1992 | Walter | 296/98 |
| 5,112,098 | 5/1992 | Lichtmann | 296/136 |
| 5,161,849 | 11/1992 | Holland, Jr. | 296/136 X |
| 5,401,074 | 3/1995 | Timerman | 296/136 |

FOREIGN PATENT DOCUMENTS

| | | | |
|---|---|---|---|
| 2543891 | 10/1984 | France | 150/166 |
| 0026644862 | 1/1992 | France | 296/98 |

*Primary Examiner*—David M. Mitchell
*Assistant Examiner*—Kia M. Robinson
*Attorney, Agent, or Firm*—Alvin S. Blum

[57] ABSTRACT

A roll-up covering for motor vehicles comprised of a rectangular main section 10 and side flaps 14 with antenna slits 18, 20 in either to accommodate antennas. A cylinder 16 is fixed perpendicular to the length of the main section and located between the main section and the top of the vehicle while in use. The side flaps 14 partially cover the side of the vehicle while in use and fold over the top of the main section for removal. Combined, the covering rolls around the cylinder for compact storage. Rear adjustable straps 26 anchor the covering in the rear compartment of the vehicle for theft prevention and as a means of changing the fit of the covering. Front elastic straps 11 and side elastic straps 12, in conjunction with the rear adjustable straps and the cylinder, tension the main section and side flaps to provide an airspace 34. The airspace between the covering material and the majority of the top vehicle surfaces provides for insulation and ventilation.

7 Claims, 1 Drawing Sheet

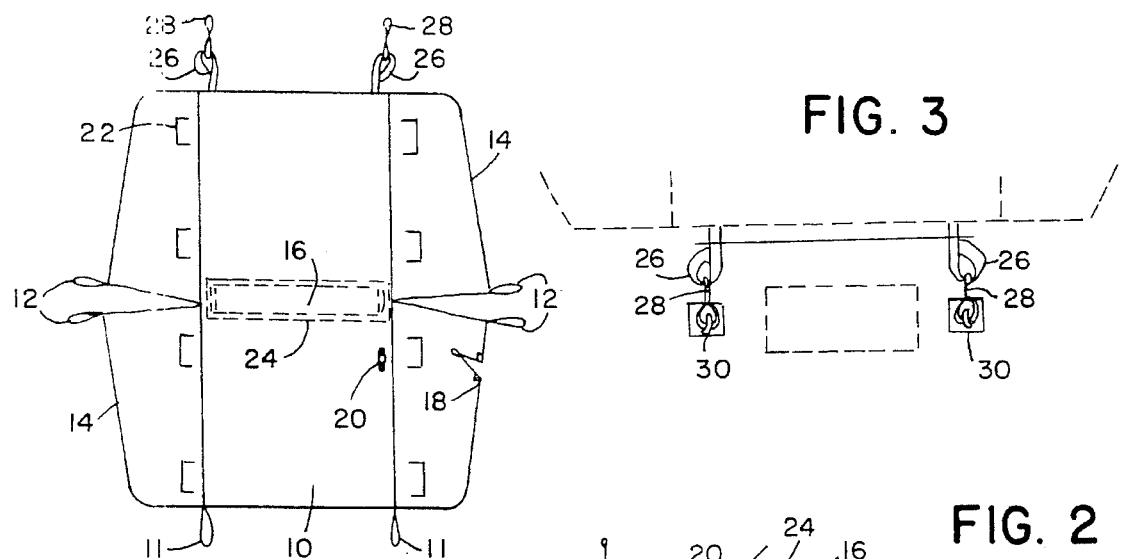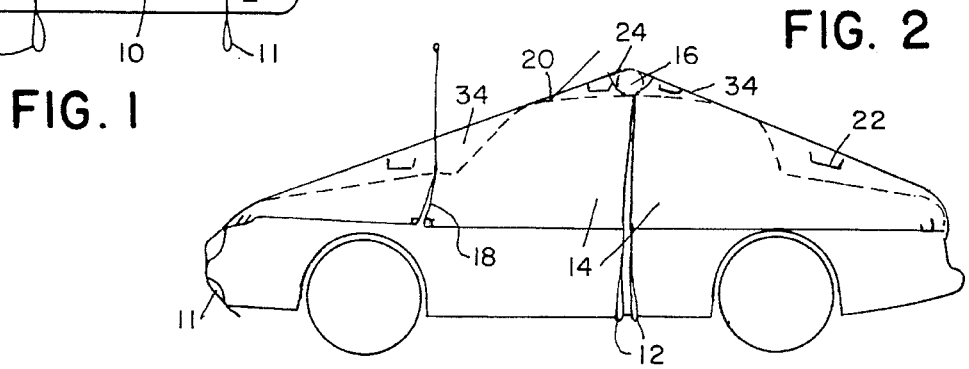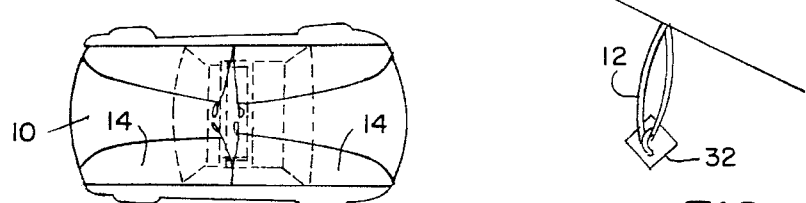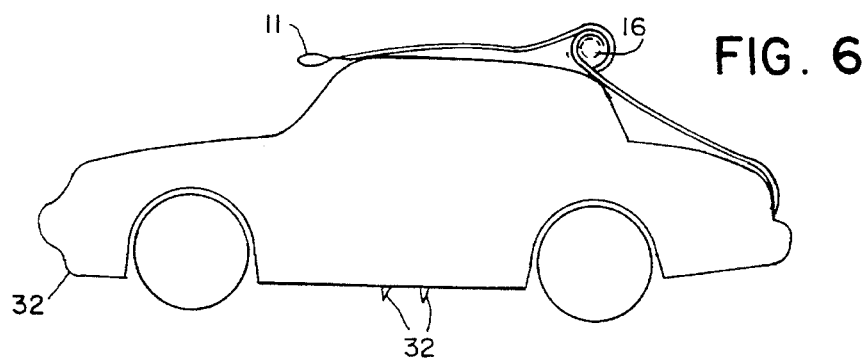

ROLL-UP ENVIRONMENTAL ELEMENTS PROTECTOR FOR A MOTOR VEHICLE

BACKGROUND—FIELD OF THE INVENTION

This invention relates to motor vehicle coverings, specifically to such coverings which roll up.

BACKGROUND—DESCRIPTION OF PRIOR ART

Many attempts have been made to provide protection for motor vehicles in the form of fabric easily storable coverings. Both complicated and non-complicated means have been devised to protect vehicles from the detriments of the environment. Namely, the sun, dust and dirt, and frozen precipitation. The lack of widespread use of such coverings can be attributed to an inadequate balance of affordability, convenience, adaptability, and performance to make them practical for everyday use. Many arrangements have been proposed: in Korea, patent 88-8029 to Yoon (1988); in Israel, patent 87970 to Karasik and Oron (1988). U.S. patents include: U.S. Pat. No. 4,958,881 to Piros (1990); U.S. Pat. No. 5,022,700 to Fascism and Aretz (1991); U.S. Pat. No. 4,848,823 to Flohr and Fascism (1989); U.S. Pat. No. 4,856,842 to Ross (1989); U.S. Pat. No. 2,751,977 to Pinker ton (1956); and U.S. Pat. No. 4718711 to Rabbit (1988). The variety of approaches have failed to address many of the issues involved in the use of such coverings. The prior art have one or more of the following negative attributes:

A. Simple fabric coverings can be difficult and time consuming to apply for one person. Also adaptability to fixed antennas is often not considered. The user who is faced with removing an antenna to apply a cover is likely to balk at using a cover of this type on a daily basis.

B. The more complicated approaches that make up the roll-up classification face a big problem of adapting to not only antennas, but also to the vastly different shapes of motor vehicles and the equally diverse trunk and rear hatch configurations; where many of these devices are connected or stored.

C. Some covering arrangements create their own problems by changing the outside appearance of the vehicle, even when it is not in use. This is disastrous for acceptability.

D. The roll-up type covers that have a spring-loaded or an electrically driven roller that is consistent has the potential to jam when reeling in a cover which is inconsistent in shape and thickness. Furthermore, these mechanisms can be difficult to install, expensive, and easy to damage.

E. Most of the prior art in this classification do not attempt to provide an airspace between the cover and the surfaces of the motor vehicle. Without an airspace and means for cross ventilation, motor vehicle coverings do not address the problem of heat and moisture build-up. Excess interior heat and mildew are the negative results.

F. Without the use of an airspace, frozen precipitation, such as hail, can damage a motor vehicle even though it is covered. Furthermore, without an airspace the covering is of no use in preventing frozen precipitation from accumulating and bonding to the covering and motor vehicle.

G. Daily use of covers means that a few seconds can separate a convenient process from an inconvenient process. Much of the prior art falls into the catagory of inconvenience; making them unacceptable for the daily user.

OBJECTS AND ADVANTAGES

My inventions provides the following objects and advantages:

(a) to provide a motor vehicle covering that can be easily manufactured in different sizes, with adjustable straps, to fit many vehicles.

(b) to provide a motor vehicle covering that provides a process for rapid one person deployment and rapid one person removal.

(c) to provide a motor vehicle covering that creates an airspace between the covering and the majority of the top and a glass surfaces of a motor vehicle to take advantage of the insulatory properties of air.

(d) to provide a motor vehicle covering that provides for cross ventilation in conjunction with the airspace that aids in temperature and mildew control.

(e) to provide a motor vehicle covering that rolls around a cylinder positioned under the main section which in conjunction with the straps provides an airspace between the covering and the majority of the top and glass surfaces of a motor vehicle.

(f) to provide a motor vehicle covering that is secured by elastic and/or non-elastic straps that fasten to hooks or receptacles and does not employ metal parts or zippers that may scratch surfaces of a motor vehicle.

(g) to provide a motor vehicle covering that, because of the airspace, prevents damage from hail and deters the build-up of frozen precipitation on the glass areas of a motor vehicle and may be used to trap hot blown air as a non-manual means of defrosting a motor vehicle.

(h) to provide a motor vehicle covering that has open or closed ended slits to accommodate antennas.

(i) to provide a motor vehicle covering that anchors in the rear compartment, while in use to provide a theft determent

DRAWING FIGURES

FIG. 1 shows various aspects of a motor vehicle covering including a main section, side flaps with vent flaps, elastic and inelastic straps, hooks connected to the rear straps, antenna slits, and a cylinder positioned under the main section of the covering.

FIG. 2 shows some aspects of a motor vehicle covering that has been deployed and shows accommodations for two common antenna placements.

FIG. 3 shows a possible anchoring method inside the rear of a motor vehicle with fixed receptacles, hooks with retainers, and straps with hook-and-loop fasteners for adjustment.

FIG. 4 shows a hook fixed near the front or side underbody and an elastic strap hooked to it.

FIG. 5 shows the side flaps folded on top of the main section.

FIG. 6 shows the covering partially rolled up.

REFERENCE NUMERALS IN DRAWINGS

10 main section
11 front elastic straps
12 side elastic straps
14 side flaps
16 cylinder
18 side flap antenna slit
20 main section antenna slit 22 vent flaps
24 cylinder pocket
26 rear adjustable straps
28 rear hooks
30 rear hook receptacles
32 elastic strap hooks
34 airspace

DESCRIPTION—FIGS. 1 to 6

A typical embodiment of the motor vehicle covering of the present invention is illustrated in FIG. 1 (top view) and FIG. 2 (side view). The covering has a main section 10 and side flaps 14 of fabric or sheeting material. The side flaps 14 are folded over the top of the vehicle as in FIG. 5 (top view) before the covering is rolled up. The covering rolls around a cylinder 16 which can be located in a cylinder pocket 24 under the main section 10 as in FIGS. 2, 6 ( side views ).

The covering is secured by elastic straps 11, 12 and elastic strap hooks as in FIGS. 1, 4. The covering is anchored in the rear compartment of a motor vehicle by rear adjustable straps 26 with rear hooks 28 attached to rear hook receptacles 30 as shown in FIG. 3.

When the covering is deployed an airspace 34 is created between the majority of the top vehicle surfaces and the main section 10 FIG. 2. The deployed covering also allows for antennas through side flap antenna slits 18 and main section antenna slits 20 FIGS. 1, 2. To allow for cross ventilation; ventilation flaps 22 can be Used (FIGS. 1, 2).

OPERATION—FIGS. 2, 3, 4, 5, 6

The manner of using the roll-up cover begins with the cover rolled around the cylinder 16 and located inside the rear compartment of a motor vehicle. The rear adjustable straps 26 will be adjusted to the vehicle and user's specifications. The rear compartment is opened and the covering is removed and drawn backward from the vehicle and parallel to the ground. The rear hooks 28 would be connected to the rear hook receptacles 30 prior to removal. Holding the covering in one hand, one would close the rear compartment with the other hand. The front elastic straps 11 would be exposed and one would place the covering on the rear of the vehicle. Next, one would grab either of the front elastic straps 11 and walk toward the front of the vehicle, thus unrolling the covering. Depending on the type and location of the antenna, one would either secure the front elastic straps 11 to the elastic strap hooks 32 at the front of the vehicle or accommodate the antenna before securing the front straps in the main section antenna slit 20. After the front elastic straps have been secured to the elastic strap hooks 32 the antenna can be accommodated, if it has not been done, in the side flap antenna slit 18. Hook-and-loop type fasteners can close the slit 18. The side flaps 14, which are stored and rolled up while folded over the main section are drawn down along the side of the vehicle. The side elastic straps 12 are hooked to the elastic strap hooks 32 fixed to the side underbody, thus completing deployment.

Removal is done in the reverse order of deployment. Once one had unhooked the elastic straps, freed the antenna, and folded the side flaps over the top; one would roll up the covering. With an open hand one would roll the cylinder over the vehicle towards the rear until the user is satisfied with the neatness and compactness of the covering. With one hand; the covering again would be drawn rearward and away from vehicle. The other hand would unlock the rear compartment. The covering would be placed inside the rear compartment until needed.

SUMMARY, RAMIFICATIONS, AND SCOPE

Accordingly, the reader will see that the motor vehicle covering of this invention is easily used by one person. Furthermore, this invention provides a deployment and removal system rapid enough to be used by the daily user. The present invention has additional advantages, in that:

- it can easily be manufactured in different sizes to accommodate different shapes and antenna placements;
- it rolls up neatly around a cylinder and stores in a compact manner;
- it provides an airspace for: insulation, protection from hail, mildew prevention due to ventilation of the airspace, prevention of frozen precipitation from bonding to vehicle surfaces, and the ability to trap warm air for defrosting purposes;
- it provides a means of securing part of the covering while in use so that theft of the covering without damage to it would require breaking into the vehicle.

Although the description above contains certain embodiments they should not limit the scope of the invention. For example, the main section and side flaps can have different shapes than shown in the FIGS. 1, 2. The number of side flaps can vary due to varying vehicle shapes. The side flaps can make accommodations for the side mirrors, common to most vehicle coverings. The cylinder can be a shape other than round and can be located inside a fabric pocket or otherwise attached. The straps and receptacles can have alternate means of connecting and adjusting. The antenna slits can vary in location and can be nonexistent and close by hook-and-loop fasteners or another method. Also vent flaps can vary in number, shape, etc.

Thus, the scope of the invention should be determined by the appended claims and their legal equivalents rather than the examples given.

I claim:

1. An easy roll-On/roll-off vehicle cover for a motor vehicle, the vehicle having a body length and body width, a top, sides, a front end, an underbody, and a rear compartment, the vehicle cover comprising:

(A) a main section of flexible sheeting material arranged to substantially cover the top of the vehicle when deployed thereon, the main section having a front edge, a rear edge, a top face, a bottom face, and side edges;

(B) a, plurality of rear straps having first ends affixed to the rear edge, and second ends attachable to the vehicle within the rear compartment;

(C) a plurality of front straps having first strap ends affixed to the front edge and second strap ends attachable to the vehicle at the front end and underbody thereof;

(D) a single elongate tubular element attached to the bottom face of the main section substantially midway between the front and rear edges, and extending substantially between the side edges;

(E) side flaps of flexible sheet material affixed to the side edges of the main section and arranged to cover the sides of the vehicle when the-cover is deployed;

(F) a plurality of side straps having first and second ends with the first ends affixed to the side flaps and the second ends attachable, to the vehicle at the sides and underbody thereof;

(G) the cover being removable from a deployed condition on the vehicle by being rolled up within the rear compartment by releasing the front straps and the side straps from the vehicle, placing the side flaps onto the top face of the main section, and manually rolling the tubular element toward the rear compartment so as to roll the main section and the side flaps onto the tubular element and stowing the rolled up cover within the rear compartment.

2. The vehicle cover according to claim 1, in which the tubular element is interposed between the main section and the vehicle top to thereby provide an air space beneath the main section when the cover is deployed on a vehicle.

3. The vehicle cover according to claim 2, in which the front straps and the side straps are elastic to thereby provide tension on the cover when deployed to provide air space between the cover and the vehicle top.

4. The vehicle cover according to claim 3, further comprising ventilation flaps in the side flaps.

5. The vehicle cover according to claim 4, in which the tubular element is cylindrical.

6. The vehicle cover according to claim 5, further comprising apertures for antenae.

7. The vehicle cover according to claim 4, in which the second ends of the rear straps may be locked within the rear compartment when the cover is deployed for theft deterrence.

* * * * *